US006947558B1

(12) United States Patent
Graunke et al.

(10) Patent No.: US 6,947,558 B1
(45) Date of Patent: Sep. 20, 2005

(54) STREAM CIPHER HAVING A SHUFFLE NETWORK COMBINER FUNCTION

(75) Inventors: Gary L. Graunke, Hillsboro, OR (US); David A. Lee, Beaverton, OR (US); Robert W. Faber, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,589

(22) Filed: Aug. 29, 1999

(51) Int. Cl.$^7$ .............................. H04K 1/06; H04L 9/00
(52) U.S. Cl. ............................. 380/37; 380/43; 380/44; 380/47
(58) Field of Search ............................. 380/37, 43, 44, 380/47; 708/251, 252

(56) References Cited

U.S. PATENT DOCUMENTS

| 4,004,089 | A | * | 1/1977 | Richard et al. ............... 380/46 |
| 4,316,055 | A |   | 2/1982 | Feistel |
| 4,613,901 | A |   | 9/1986 | Gilhousen et al. |
| 4,953,208 | A |   | 8/1990 | Ideno |
| 5,020,106 | A |   | 5/1991 | Rabold et al. |

(Continued)

FOREIGN PATENT DOCUMENTS

| EP | 0 599 366 | 2/1993 |
| WO | WO 96-06504 | 2/1996 |
| WO | WO 99/19822 | 9/1998 |
| WO | WO 99/18729 | 4/1999 |
| WO | WO 01-17251 | 3/2001 |

OTHER PUBLICATIONS

The Art Of Computer Programming, Volume 2/Seminumerical Algorithms, © 1969, Addison–Wesley Publishing Company, Inc., Reading, Massachusetts; Menlo Park, California; London: Amsterdam; Don Mills, Ontario; Sydney, pp. 30–31.

Heys, Howard M., An Analysis of the Statistical Self–Synchronization of Stream Ciphers, IEEE INFOCOM 2001, pp. 897–904.

Heys, Howard M., Delay Characteristics of Statistical Cipher Feedback Mode, IEEE 2001, pp. 5–9.

Simmons, Gustavus J., Symmetric and Asymmetric Encryption, Computing Surveys, vol. 11, No. 4, Dec. 1979, pp. 305–330.

U.S. Appl. No. 09/385,592, filed Aug. 29, 1999, pending.
U.S. Appl. No. 09/385,591, filed Aug. 29, 1999, pending.
U.S. Appl. No. 09/385,590, filed Aug. 29, 1999, pending.
U.S. Appl. No. 09/540,190, filed Mar. 31, 2000, pending.
U.S. Appl. No. 09/675,645, filed Sep. 29, 2000, pending.
U.S. Appl. No. 09/607,792, filed Jun. 30, 2000, pending.
U.S. Appl. No. 09/608,996, filed Jun. 30, 2000, pending.
Written Opinion for PCT/US00/22834; 1 page.

Bruce Schneier, "Applied Cryptography: protocols, algorithms, and source code in C", Second Edition, Library of Congress, Copyright 1996, Chapters 2–6 and 12–17.

*Primary Examiner*—Gilberto Barrón Jr.
*Assistant Examiner*—Grigory Gurshman
(74) *Attorney, Agent, or Firm*—Justin B. Scout

(57) ABSTRACT

A stream cipher is provided with one or more data bit generators to generate a first, second and third set of data bits. The stream cipher is further provided with a combiner function having a network of shuffle units to combine the third set of data bits, using the first and second sets of data bits as first input data bits and control signals respectively of the network of shuffle units. In one embodiment, the shuffle units are binary shuffle units and they are serially coupled to one another.

29 Claims, 4 Drawing Sheets

U.S. PATENT DOCUMENTS

| | | |
|---|---|---|
| 5,195,136 A | 3/1993 | Hardy et al. |
| 5,341,425 A * | 8/1994 | Wasilewski et al. ........ 380/212 |
| 5,509,073 A | 4/1996 | Monnin |
| 5,590,194 A | 12/1996 | Ryan |
| 5,621,799 A | 4/1997 | Katta et al. |
| 5,657,095 A | 8/1997 | Yoshida et al. |
| 5,673,319 A | 9/1997 | Bellare et al. |
| 5,825,879 A | 10/1998 | Davis |
| 5,852,472 A | 12/1998 | Prasad et al. |
| 5,862,150 A | 1/1999 | Lavelle et al. |
| 5,940,509 A | 8/1999 | Jovanovich et al. |
| 6,005,940 A | 12/1999 | Kulinets |
| 6,061,449 A | 5/2000 | Candelore et al. |
| 6,167,136 A | 12/2000 | Chou |
| 6,345,101 B1 * | 2/2002 | Shukla ........................ 380/210 |

* cited by examiner

STREAM CIPHER HAVING A SHUFFLE NETWORK COMBINER FUNCTION

BACKGROUND OF THE INVENTION

1. Field of the Invention

The present invention relates to the field of cryptography. More specifically, the present invention relates to the robustness of stream ciphers.

2. Background Information

Crytographic ciphers can be broadly divided into block ciphers and stream ciphers. Block ciphers cipher a block of plain text into ciphered text by applying multiple successive rounds of transformation to the plain text, using a cipher key. An example of a block cipher is the well known DES cipher. Stream ciphers cipher a stream of plain data into ciphered data by combining the stream of plain data with a pseudo random sequence dynamically generated using a cipher key. An example of a stream cipher is the well known XPF/KPD cipher.

Most stream ciphers employ one or more linear feedback shift registers (LFSR). In various applications, it is desirable to employ multiple LFSRs to increase the robustness of a stream cipher. However, employment of multiple LFSRs requires employment of a combiner function to recombine the multiple data bits output by the LFSRS. Most combiner functions known in the art are inefficient in their real estate requirement for hardware implementations. Thus, a robust stream cipher with a more efficient combiner function is desired.

SUMMARY OF THE INVENTION

A stream cipher is provided with one or more data bit generators to generate a first, second and third set of data bits. The stream cipher is further provided with a combiner function having a network of shuffle units to combine the third set of data bits, using the first and second sets of data bits as input data bits and control signals respectively of the network of shuffle units.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
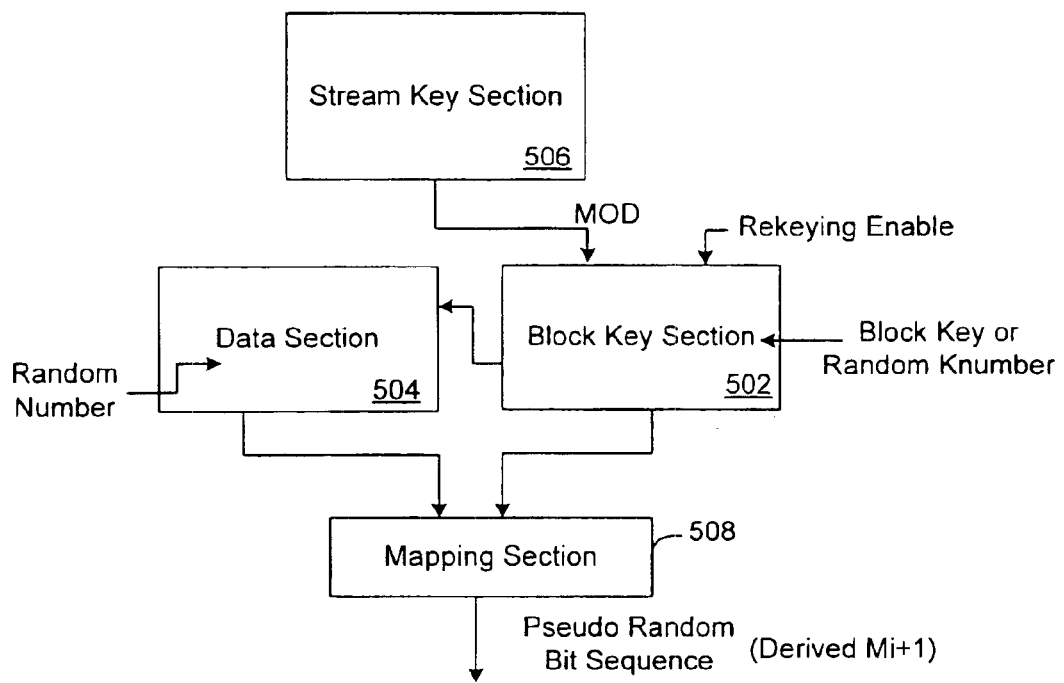
FIG. 1 illustrates an overview of the combined block/stream cipher of the present invention, in accordance with one embodiment.

Referring now to FIG. 1, wherein a block diagram illustrating the combined block/stream cipher of the present invention, in accordance with one embodiment, is shown. As illustrated, combined block/stream cipher 110 includes block key section 502, data section 504, stream key section 506, and mapping section 508, coupled to one another. Block key section 502 and data section 504 are employed in both the block mode as well as the stream mode of operation, whereas stream key section 506 and mapping section 508 are employed only in the stream mode of operation.

Briefly, in block mode, block key section 502 is provided with a block cipher key, such as an authentication key Km or a session key Ks of a video content protection application; whereas data section 504 is provided with the plain text, such as a basis random number An or a derived random number Mi-1 of a video content protection application. "Rekeying enable" signal is set to a "disabled" state, operatively de-coupling block key section 502 from stream key section 506 during the block mode of operation.

A video content protection. application that uses Km, Kx, An and Mi is described in copending U.S. patent application Ser. Nos. 09/385,590 and 09/385,592, filed contemporaneously, both entitled "Digital Video Content Transmission Ciphering And Decipher Method an Apparatus" and "Digital Video Content Transmission Ciphering And Deciphering Method And Apparatus" having common assignee and inventorship with the present application.

During each clock cycle, the block cipher key as well as the plain text are transformed. The block cipher key is independently transformed, whereas transformation of the plain text is dependent on the transformation being performed on the block cipher key. After a desired number of clock cycles, the provided plain text is transformed into ciphered text. For the video content protection method disclosed in above mentioned co-pending applications, when block key section 502 is provided with Km and data section 504 is provided with the An, ciphered An is read out and used as the session key Ks. When block key section 502 is provided with Ks and data section 504 is provided with the Mi-1, ciphered Mi-1 is read out and used as the frame key Ki.

To decipher the ciphered plain text, block key section 502 and data section 504 are used in like manner as described above to generate the intermediate "keys", which are stored away (in storage locations not shown). The stored intermediate "keys" are then applied to the ciphered text in reversed order, resulting in the deciphering of the ciphered text back into the original plain text. Another approach to deciphering the ciphered text will be described after block key section 502 and data section 504 have been further described in accordance with one embodiment each, referencing FIGS. 2–3.

In stream mode, stream key section 506 is provided with a stream cipher key, such as a session key Ks or a frame key Ki of a video content protection application. Block key section 502 and data section 504 are provided with random numbers, such as a session/frame keys Ks/Ki and a derived random numbers Mi-1 of a video content protection application. "Rekeying enable" signal is set to an "enabled" state, operatively coupling block key section 502 to stream key section 506. Periodically, at predetermined intervals, such as the horizontal blanking intervals of a video frame, stream key section 506 is used to generate one or more data bits to dynamically modify the then current state of the random number stored in block data section 502. During each clock cycle, in between the predetermined intervals, both random numbers stored in block key section 502 and data section 504 are transformed. The random number provided to block key section 502 is independently transformed, whereas transformation of the random number provided to data section 504 is dependent on the transformation being performed in block key section 502. Mapping block 506 retrieves a subset each, of the newly transformed states of the two random numbers, and reduces them to generate one bit of the pseudo random bit sequence. Thus, in a desired number of clock cycles, a pseudo random bit sequence of a desired length is generated.

For the illustrated embodiment, by virtue of the employment of the "rekeying enable" signal, stream key section 506 may be left operating even during the block mode, as its outputs are effectively discarded by the "rekeying enable" signal (set in a "disabled" state).

Figure 2:
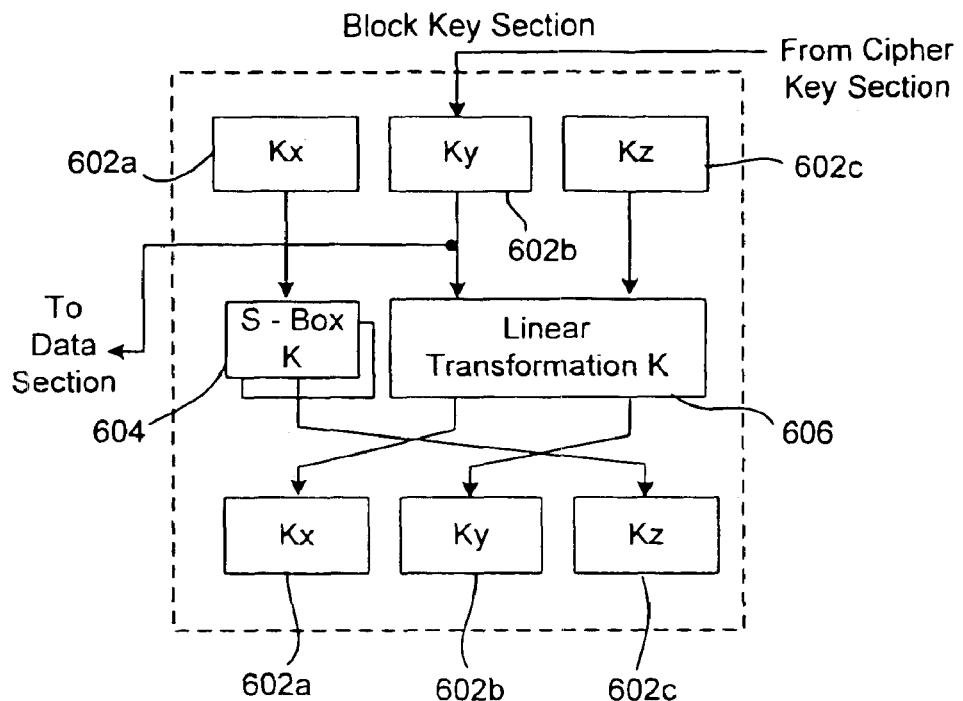
FIG. 2 illustrates the block key section of FIG. 1 in further detail, in accordance with one embodiment.

FIG. 2 illustrates the block key section of FIG. 1 in further detail, in accordance with one embodiment. As illustrated, block key section 502 includes registers 602a–602c, substitution boxes 604, and linear transformation unit 606. In block mode, registers 602a–602c are collectively initialized to a block cipher key, e.g. the earlier mentioned authentication key Km or session key Ks. In stream mode, registers 602a–602c are collectively initialized to a random number, e.g. the earlier mentioned session key Ks or frame key Ki. Each round, substitution boxes 604 and linear transformation unit 606 modify the content of registers 602a–602c. More specifically, substitution boxes 604 receive the content of register 602a, modify it, and then store the substituted content into register 602c. Similarly, linear transformation unit 606 receives the content of registers 602b and 602c, linearly transforms them, and then correspondingly stores the linearly transformed content into registers 602a and 602b.

Substitution boxes 604 and linear transformation unit 606 may be implemented in a variety of ways in accordance with well known cryptographic principles. One specific implementation is given in more detail below after the description of FIG. 3.

Figure 3:
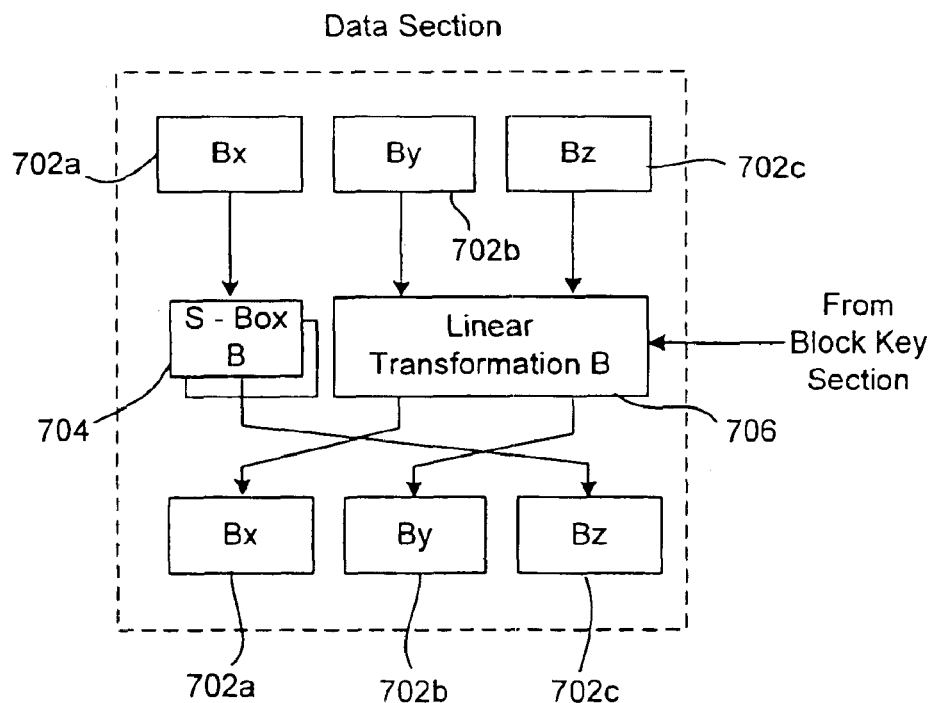
FIG. 3 illustrates the block data section of FIG. 1 in further detail, in accordance with one embodiment.

FIG. 3 illustrates the block data section of FIG. 1 in further detail, in accordance with one embodiment. For the illustrated embodiment, data section 504 is similarly constituted as block key section 502, except linear transformation unit 706 also takes into consideration the content of register 602b, when transforming the contents of registers 702b–702c. In block mode, registers 702a–702c are collectively initialized with the target plain text, e.g. earlier described random number An or derived random number Mi-1. In stream mode, registers 702a–702c are collectively initialized with a random number. Each round, substitution boxes 704 and linear transformation unit 706 modify the content of registers 702a–702c as described earlier for block key section 502 except for the differences noted above.

Again, substitution boxes 604 and linear transformation unit 606 may be implemented in a variety of ways in accordance with well known cryptographic principles.

In one implementation for the above described embodiment, each register 602a, 602b, 602c, 702a, 702b, 702c is 28-bit wide. [Whenever registers 602a–602c or 702a–702cb collectively initialized with a key value or random number less than 84 bits, the less than 84-bit number is initialized to the lower order bit positions with the higher order bit positions zero filled.] Additionally, each set of substitution boxes 604 or 704 are constituted with seven 4 input by 4 output substitution boxes. Each linear transformation unit 606 or 706 produces 56 output values by combining outputs from eight diffusion networks (each producing seven outputs). More specifically, the operation of substitution boxes 604/704 and linear transformation unit 606/706 are specified by the four tables to follow. For substitution boxes 604/704, the Ith input to box J is bit 1*7+J of register 602a/702a, and output I of box J goes to bit 1*7+j of register 602c/702c. [Bit 0 is the least significant bit.] For each diffusion network (linear transformation unit 606 as well as 706), the inputs are generally labeled 10–16 and the outputs are labeled O0–O6. The extra inputs for each diffusion network of the linear transformation unit 706 is labeled K0–K6.

TABLE I

Substitution performed by each of the seven constituting substitution boxes of substitution boxes 604/704.

|     | 0  | 1  | 2  | 3  | 4  | 5  | 6  | 7  | 8  | 9  | 10 | 11 | 12 | 13 | 14 | 15 |
|-----|----|----|----|----|----|----|----|----|----|----|----|----|----|----|----|----|
| SK0 | 8  | 14 | 5  | 9  | 3  | 0  | 12 | 6  | 1  | 11 | 15 | 2  | 4  | 7  | 10 | 13 |
| SK1 | 1  | 6  | 4  | 15 | 8  | 3  | 11 | 5  | 10 | 0  | 9  | 12 | 7  | 13 | 14 | 2  |
| SK2 | 13 | 11 | 8  | 6  | 7  | 4  | 2  | 15 | 1  | 12 | 14 | 0  | 10 | 3  | 9  | 5  |
| SK3 | 0  | 14 | 11 | 7  | 12 | 3  | 2  | 13 | 15 | 4  | 8  | 1  | 9  | 10 | 5  | 6  |
| SK4 | 12 | 7  | 15 | 8  | 11 | 14 | 1  | 4  | 6  | 10 | 3  | 5  | 0  | 9  | 13 | 2  |
| SK5 | 1  | 12 | 7  | 2  | 8  | 3  | 4  | 14 | 11 | 5  | 0  | 15 | 13 | 6  | 10 | 9  |
| SK6 | 10 | 7  | 6  | 1  | 0  | 14 | 3  | 13 | 12 | 9  | 11 | 2  | 15 | 5  | 4  | 8  |
| SB0 | 12 | 9  | 3  | 0  | 11 | 5  | 13 | 6  | 2  | 4  | 14 | 7  | 8  | 15 | 1  | 10 |
| SB1 | 3  | 8  | 14 | 1  | 5  | 2  | 11 | 13 | 10 | 4  | 9  | 7  | 6  | 15 | 12 | 0  |
| SB2 | 7  | 4  | 1  | 10 | 11 | 13 | 14 | 3  | 12 | 15 | 6  | 0  | 2  | 8  | 9  | 5  |
| SB3 | 6  | 3  | 1  | 4  | 10 | 12 | 15 | 2  | 5  | 14 | 11 | 8  | 9  | 7  | 0  | 13 |
| SB4 | 3  | 6  | 15 | 12 | 4  | 1  | 9  | 2  | 5  | 8  | 10 | 7  | 11 | 13 | 0  | 14 |
| SB5 | 11 | 14 | 6  | 8  | 5  | 2  | 12 | 7  | 1  | 4  | 15 | 3  | 10 | 13 | 9  | 0  |
| SB6 | 1  | 11 | 7  | 4  | 2  | 5  | 12 | 9  | 13 | 6  | 8  | 15 | 14 | 0  | 3  | 10 |

TABLE II

Diffusion networks for linear transformation unit 606/706
(continued in Tables III & IV).

Diffusion Network Logic Function

| | |
|---|---|
| $O_0$ | $K_0 \oplus \phantom{I_0 \oplus} I_1 \oplus I_2 \oplus I_3 \oplus I_4 \oplus I_5 \oplus I_6$ |
| $O_1$ | $K_1 \oplus I_0 \oplus \phantom{I_1 \oplus} I_2 \oplus I_3 \oplus I_4 \oplus I_5 \oplus I_6$ |
| $O_2$ | $K_2 \oplus I_0 \oplus I_1 \oplus \phantom{I_2 \oplus} I_3 \oplus I_4 \oplus I_5 \oplus I_6$ |
| $O_3$ | $K_3 \oplus I_0 \oplus I_1 \oplus I_2 \oplus \phantom{I_3 \oplus} I_4 \oplus I_5 \oplus I_6$ |
| $O_4$ | $K_4 \oplus I_0 \oplus I_1 \oplus I_2 \oplus I_3 \oplus \phantom{I_4 \oplus} I_5 \oplus I_6$ |
| $O_5$ | $K_5 \oplus I_0 \oplus I_1 \oplus I_2 \oplus I_3 \oplus I_4 \oplus \phantom{I_5 \oplus} I_6$ |
| $O_6$ | $K_6 \oplus I_0 \oplus I_1 \oplus I_2 \oplus I_3 \oplus I_4 \oplus I_5 \oplus I_6$ |

TABLE III

Diffusion networks for linear transformation unit 606/706
(continued in Table IV).

| | K1 | K2 | K3 | K4 | K5 | K6 | K7 | K8 |
|---|---|---|---|---|---|---|---|---|
| $I_0$ | Kz0 | Ky0 | Ky4 | Ky8 | Ky12 | Ky16 | Ky20 | Ky24 |
| $I_1$ | Kz1 | Ky1 | Ky5 | Ky9 | Ky13 | Ky17 | Ky21 | Ky25 |
| $I_2$ | Kz2 | Ky2 | Ky6 | Ky10 | Ky14 | Ky18 | Ky22 | Ky26 |
| $I_3$ | Kz3 | Ky3 | Ky7 | Ky11 | Ky15 | Ky19 | Ky23 | Ky27 |
| $I_4$ | Kz4 | Kz7 | Kz10 | Kz13 | Kz16 | Kz19 | Ky22 | Ky25 |
| $I_5$ | Kz5 | Kz8 | Kz11 | Kz14 | Kz17 | Kz20 | Kz23 | Kz26 |
| $I_6$ | Kz6 | Kz9 | Kz12 | Kz15 | Kz18 | Kz21 | Kz24 | Kz27 |
| $O_0$ | Kx0 | Ky0 | Ky1 | Ky2 | Ky3 | Kx7 | Kx8 | Kx9 |
| $O_1$ | Kx1 | Ky4 | Ky5 | Ky6 | Ky7 | Kx10 | Kx11 | Kx12 |
| $O_2$ | Kx2 | Ky8 | Ky9 | Ky10 | Ky11 | Kx13 | Kx14 | Kx15 |
| $O_3$ | Kx3 | Ky12 | Ky13 | Ky14 | Ky15 | Kx16 | Kx17 | Kx18 |
| $O_4$ | Kx4 | Ky16 | Ky17 | Ky18 | Ky19 | Kx19 | Kx20 | Kx21 |
| $O_5$ | Kx5 | Ky20 | Ky21 | Ky22 | Ky23 | Kx22 | Kx23 | Kx24 |
| $O_6$ | Kx6 | Ky24 | Ky25 | Ky26 | Ky27 | Kx25 | Kx26 | Kx27 |

TABLE IV

Diffusion networks for linear transformation unit 606/706
(continued from Table III).

| | B1 | B2 | B3 | B4 | B5 | B6 | B7 | B8 |
|---|---|---|---|---|---|---|---|---|
| $I_0$ | Bz0 | By0 | By4 | By8 | By12 | By16 | By20 | By24 |
| $I_1$ | Bz1 | By1 | By5 | By9 | By13 | By17 | By21 | By25 |
| $I_2$ | Bz2 | By2 | By6 | By10 | By14 | By18 | By22 | By26 |
| $I_3$ | Bz3 | By3 | By7 | By11 | By15 | By19 | By23 | By27 |
| $I_4$ | Bz4 | Bz7 | Bz10 | Bz13 | Bz16 | Bz19 | By22 | By25 |
| $I_5$ | Bz5 | Bz8 | Bz11 | Bz14 | Bz17 | Bz20 | Bz23 | Bz26 |
| $I_6$ | Bz6 | Bz9 | Bz12 | Bz15 | Bz18 | Bz21 | Bz24 | Bz27 |
| $K_0$ | Ky0 | — | — | — | — | Ky7 | Ky14 | Ky21 |
| $K_1$ | Ky1 | — | — | — | — | Ky8 | Ky15 | Ky22 |
| $K_2$ | Ky2 | — | — | — | — | Ky9 | Ky16 | Ky23 |
| $K_3$ | Ky3 | — | — | — | — | Ky10 | Ky17 | Ky24 |
| $K_4$ | Ky4 | — | — | — | — | Ky11 | Ky18 | Ky25 |
| $K_5$ | Ky5 | — | — | — | — | Ky12 | Ky19 | Ky26 |
| $K_6$ | Ky6 | — | — | — | — | Ky13 | Ky20 | Ky27 |
| $O_0$ | Bx0 | By0 | By1 | By2 | By3 | Bx7 | Bx8 | Bx9 |
| $O_1$ | Bx1 | By4 | By5 | By6 | By7 | Bx10 | Bx11 | Bx12 |
| $O_2$ | Bx2 | By8 | By9 | By10 | By11 | Bx13 | Bx14 | Bx15 |
| $O_3$ | Bx3 | By12 | By13 | By14 | By15 | Bx16 | Bx17 | Bx18 |
| $O_4$ | Bx4 | By16 | By17 | By18 | By19 | Bx19 | Bx20 | Bx21 |
| $O_5$ | Bx5 | By20 | By21 | By22 | By23 | Bx22 | Bx23 | Bx24 |
| $O_6$ | Bx6 | By24 | By25 | By26 | By27 | Bx25 | Bx26 | Bx27 |

Referring now back to FIG. 5, recall that a ciphered text may be deciphered by generating the intermediate "keys" and applying them backward. Alternatively, for an embodiment where either the inverse of substitution boxes 604/704 and linear transformation units 606/706 are included or they may be dynamically reconfigured to operate in an inverse manner, the ciphered text may be deciphered as follows. First, the cipher key used to cipher the plain text is loaded into block key section 502, and block key section 502 is advanced by R−1 rounds, i.e. one round short of the number of rounds (R) applied to cipher the plain text. After the initial R−1 rounds, the ciphered text is loaded into data section 504, and both sections, block key section 502 and data section 504, are operated "backward", i.e. with substitution boxes 604/704 and linear transformation units 6061706 applying the inverse substitutions and linear transformations respectively.

Figure 4A:
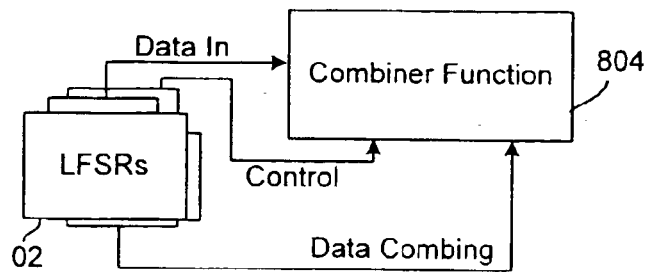
FIGS. 4a–4c illustrate the stream data section of FIG. 1 in further detail, in accordance with one embodiment.
Figure 4C:
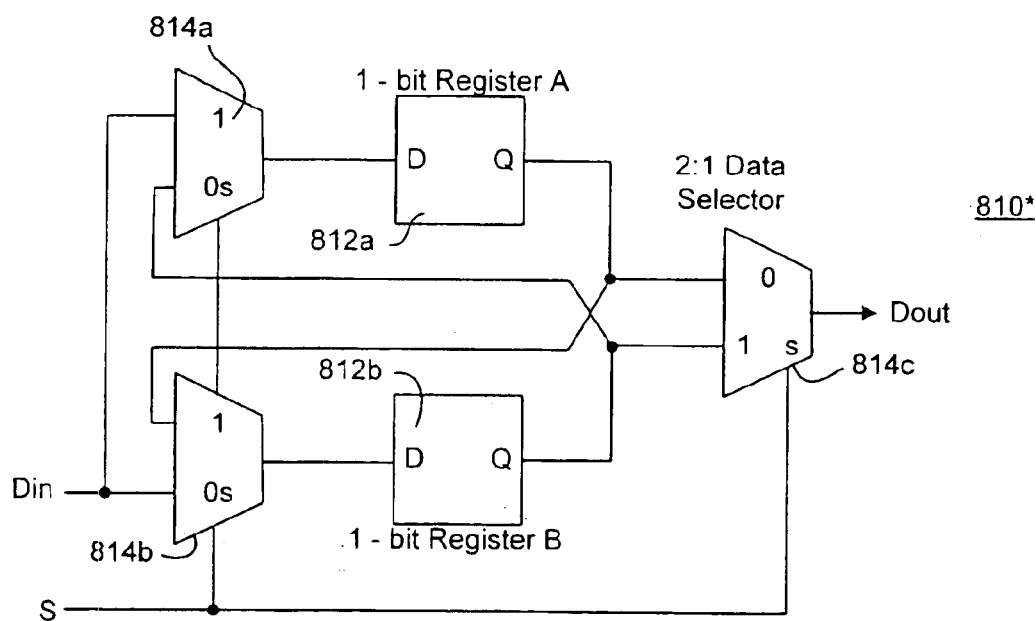
Figure 4B:
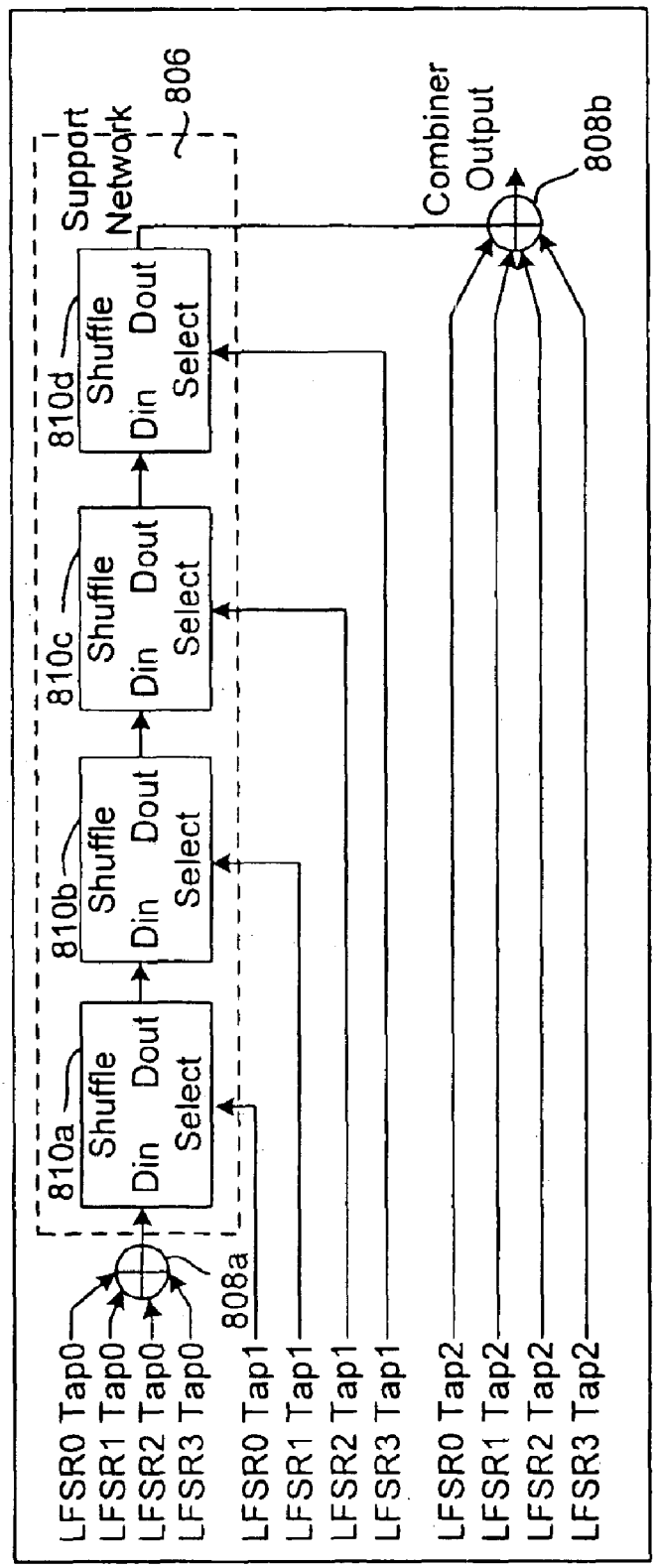

FIGS. 4a–4c illustrate the stream key section of FIG. 1 in further detail, in accordance with one embodiment. As illustrated in FIG. 4a, stream key section 506 includes a number of linear feedback shift registers (LFSRs) 802 and combiner function 804, coupled to each other as shown. LFSRs 802 are collectively initialized with a stream cipher key, e.g. earlier described frame key Ki. During operation, the stream cipher key is successively shifted through LFSRs 802. Selective outputs are taken from LFSRs 802, and combiner function 804 is used to combine the selective outputs. In stream mode (under which, rekeying is enabled), the combined result is used to dynamically modify a then current state of a block cipher key in block key section 502.

For the illustrated embodiment, four LFSRs of different lengths are employed. Three sets of outputs are taken from the four LFSRs. The polynomials represented by the LFSR and the bit positions of the three sets of LFSR outputs are given by the table to follows:

TABLE V

Polynomials of the LFSR and tap positions.

| | | Combining Function Taps | | |
|---|---|---|---|---|
| LFSR | Polynomial | 0 | 1 | 2 |
| 3 | $X^{17} + x^{15} + x^{11} + x^5 + 1$ | 6 | 12 | 17 |
| 2 | $X^{16} + x^{15} + x^{12} + x^8 + x^7 + x^5 + 1$ | 6 | 10 | 16 |
| 1 | $X^{14} + x^{11} + x^{10} + x^7 + x^6 + x^4 + 1$ | 5 | 9 | 14 |
| 0 | $X^{13} + x^{11} + x^9 + x^5 + 1$ | 4 | 8 | 13 |

The combined result is generated from the third set of LFSR outputs, using the first and second set of LFSR outputs as data and control inputs respectively to combiner function 802. The third set of LFSR outputs are combined into a single bit. In stream mode (under which, rekeying is enabled), the combined single bit is then used to dynamically modify a predetermined bit of a then current state of a block cipher key in block key section 502.

FIG. 4b illustrates combiner function 804 in further detail, in accordance with one embodiment. As illustrated, combiner function 804 includes shuffle network 806 and XOR 808a–808b, serially coupled to each other and LFSRs 802 as shown. For the illustrated embodiment, shuffle network 806 includes four binary shuffle units 810a–810d serially coupled to each other, with first and last binary shuffle units 810a and 810d coupled to XOR 808a and 808b respectively. XOR 808a takes the first group of LFSR outputs and combined them as a single bit input for shuffle network 806. Binary shuffle units 810a–810d serially propagate and shuffle the output of XOR 808a. The second group of LFSR outputs are used to control the shuffling at corresponding ones of binary shuffle units 810a–810d. XOR 808b combines the third set of LFSR outputs with the output of last binary shuffle unit 810d.

FIG. 4c illustrates one binary shuffle unit 810\* (where \* is one of a–d) in further detail, in accordance with one embodiment. Each binary shuffle unit 810\* includes two flip-flops 812a and 812b, and a number of selectors 814a–814c, coupled to each other as shown. Flip-flops 812a and 812b are used to store two state values (A, B). Each selector 814a, 814b or 814c receives a corresponding one of the second group of LFSR outputs as its control signal. Selector 814a–814b also each receives the output of XOR 808a or an immediately preceding binary shuffle unit 810* as input. Selector 814a–814b are coupled to flip-flops 812a–812b to output one of the two stored state values and to shuffle as well as modify the stored values in accordance with the state of the select signal. More specifically, for the illustrated embodiment, if the stored state values are (A, B), and the input and select values are (D, S), binary shuffle unit 810* outputs A, and stores (B, D) if the value of S is "0". Binary shuffle unit 810* outputs B, and stores (D, A) if the value of S is "1".

Referring now to back to FIG. 1, as illustrated and described earlier, mapping function 508 generates the pseudo random bit sequence based on the contents of selected registers of block key section 502 and data section 504. In one embodiment, where block key section 502 and data section 504 are implemented in accordance with the respective embodiments illustrated in FIG. 2–3, mapping function 508 generates the pseudo random bit sequence at 24-bit per clock based on the contents of registers (Ky and Kz) 602b–602c and (By and Bz) 702b–702c. More specifically, each of the 24 bits is generated by performing the XOR operation on nine terms in accordance with the following formula:

$$(B0 \cdot K0) \oplus (B1 \cdot K1) \oplus (B2 \cdot K2) \oplus (B3 \cdot K3) \oplus (B4 \cdot K4) \oplus (B5 \cdot K5) \oplus (B6 \cdot K6) \oplus B7 \oplus K7$$

Where "$\oplus$" represents a logical XOR function, "•" represents a logical AND function, and the input values B and K for the 24 output bits are has been described with the illustrated embodiments, non-LFSR based stream key section, more or less block key registers, larger or smaller block key registers, more or less substitution units, including alternative substitution patterns, as well as different linear transformation units may be employed. Thus, the present invention is not limited by the details described, instead, the present invention can be practiced with modifications and alterations within the spirit and scope of the appended claims.

What is claimed is:

1. An apparatus comprising:
    at least one data bit generator to generate a first, second and third plurality of data bits; and
    a combiner function, coupled to the at least one data bit generator, including a network of shuffle units, to combine the third plurality of data bits, using the first and second plurality of data bits as first input data bits and control signals respectively of the network of shuffle units.

2. The apparatus of claim 1, wherein at least one of the shuffle units comprises a first and a second flip-flop to store a first and a second state value, and a plurality of selectors coupled to the first and second flip-flops in a topological manner to control selective output of one of the first and second state values based on a corresponding one of said second plurality of data bits.

3. The apparatus of claim 2, wherein said plurality of selectors are coupled to said first and second flip-flops of the shuffle unit in a topological manner that results in the first state value of the shuffle unit being output when the corresponding one of said second plurality of data bits is in a first state, and the second state value of the shuffle unit being output when the corresponding one of said second plurality of data bits is in a second state.

| Input Origin | B0 | B1 | B2 | B3 | B4 | B5 | B6 | B7 | K0 | K1 | K2 | K3 | K4 | K5 | K6 | K7 |
| Output bit | Bz | Bz | Bz | Bz | Bz | Bz | Bz | By | Kz | Kz | Kz | Kz | Kz | Kz | Kz | Ky |
|---|---|---|---|---|---|---|---|---|---|---|---|---|---|---|---|---|
| 0 | 14 | 23 | 7 | 27 | 3 | 18 | 8 | 20 | 12 | 24 | 0 | 9 | 16 | 7 | 20 | 13 |
| 1 | 20 | 26 | 6 | 15 | 8 | 19 | 0 | 10 | 26 | 18 | 1 | 11 | 6 | 20 | 12 | 19 |
| 2 | 7 | 20 | 2 | 10 | 19 | 14 | 26 | 17 | 1 | 22 | 8 | 13 | 7 | 16 | 25 | 3 |
| 3 | 22 | 12 | 6 | 17 | 3 | 10 | 27 | 4 | 24 | 2 | 9 | 5 | 14 | 18 | 21 | 15 |
| 4 | 22 | 24 | 14 | 18 | 7 | 1 | 9 | 21 | 19 | 24 | 20 | 8 | 13 | 6 | 3 | 5 |
| 5 | 12 | 1 | 16 | 5 | 10 | 24 | 20 | 14 | 27 | 2 | 8 | 16 | 15 | 22 | 4 | 21 |
| 6 | 5 | 3 | 27 | 8 | 17 | 15 | 21 | 12 | 14 | 23 | 16 | 10 | 27 | 1 | 7 | 17 |
| 7 | 9 | 20 | 1 | 16 | 5 | 25 | 12 | 6 | 9 | 13 | 22 | 17 | 1 | 24 | 5 | 11 |
| 8 | 23 | 25 | 11 | 13 | 17 | 1 | 6 | 22 | 25 | 21 | 18 | 15 | 6 | 11 | 1 | 10 |
| 9 | 4 | 0 | 22 | 17 | 25 | 10 | 15 | 18 | 0 | 20 | 26 | 19 | 4 | 15 | 9 | 27 |
| 10 | 23 | 25 | 9 | 2 | 13 | 16 | 4 | 8 | 2 | 11 | 27 | 19 | 14 | 22 | 4 | 7 |
| 11 | 3 | 6 | 20 | 12 | 25 | 19 | 10 | 27 | 24 | 3 | 14 | 6 | 23 | 17 | 10 | 1 |
| 12 | 26 | 1 | 18 | 21 | 14 | 4 | 10 | 0 | 17 | 7 | 26 | 0 | 23 | 11 | 14 | 8 |
| 13 | 2 | 11 | 4 | 21 | 15 | 24 | 18 | 9 | 5 | 16 | 12 | 2 | 26 | 23 | 11 | 6 |
| 14 | 22 | 24 | 3 | 19 | 11 | 4 | 13 | 5 | 22 | 0 | 18 | 8 | 25 | 5 | 15 | 2 |
| 15 | 12 | 0 | 27 | 11 | 22 | 5 | 16 | 1 | 10 | 3 | 15 | 19 | 21 | 27 | 6 | 18 |
| 16 | 24 | 20 | 2 | 7 | 15 | 18 | 8 | 3 | 12 | 20 | 5 | 19 | 1 | 27 | 8 | 23 |
| 17 | 12 | 16 | 8 | 24 | 7 | 2 | 21 | 23 | 17 | 2 | 11 | 14 | 7 | 25 | 22 | 16 |
| 18 | 19 | 3 | 22 | 9 | 13 | 6 | 25 | 7 | 4 | 10 | 2 | 17 | 21 | 24 | 13 | 22 |
| 19 | 11 | 17 | 13 | 26 | 4 | 21 | 2 | 16 | 3 | 4 | 13 | 26 | 18 | 23 | 9 | 25 |
| 20 | 17 | 23 | 26 | 14 | 5 | 11 | 0 | 15 | 26 | 3 | 9 | 19 | 21 | 12 | 6 | 0 |
| 21 | 9 | 14 | 23 | 16 | 27 | 0 | 6 | 24 | 18 | 21 | 3 | 27 | 4 | 10 | 15 | 26 |
| 22 | 7 | 21 | 8 | 13 | 1 | 26 | 19 | 25 | 25 | 0 | 12 | 10 | 7 | 17 | 23 | 9 |
| 23 | 27 | 15 | 23 | 5 | 0 | 9 | 18 | 11 | 8 | 0 | 25 | 20 | 16 | 5 | 13 | 12 |

Accordingly, a novel dual use block or stream cipher has been described.

Epilogue

From the foregoing description, those skilled in the art will recognize that many other variations of the present invention are possible. In particular, while the sent invention 4. The apparatus of claim 2, wherein said plurality of the selectors are further coupled to said first and second flip-flops of the shuffle unit to control selective modification of the first and second state values stored in said first and second flip-flops of the shuffle unit based on the same corresponding one of said second plurality of data bits.

5. The apparatus of claim 4, wherein said plurality of selectors are coupled to said first and second flip-flops of the shuffle unit in a topological manner that results in the first state value being output and the first and second flip-flops of the shuffle unit to store said second state value and a second input data bit respectively when the corresponding one of said second plurality of data bits is in a first state, and the second state value being output and the first and second flip-flops of the shuffle unit to store the second input data bit and said first state value respectively when the corresponding one of said second plurality of data bits is in a second state.

6. The apparatus of claim 5, wherein the second input value is a selected one of an output data bit of an immediately preceding shuffle unit and an output data bit generated from said first plurality of data bits.

7. The apparatus of claim 1, wherein at least one of the shuffle units comprises a first and a second flip-flop to store a first and a second state value, and a plurality of selectors coupled to the first and second flip-flops to control modification of the first and second state values based on a corresponding one of said second plurality of data bits.

8. The apparatus of claim 7, wherein said plurality of selectors are coupled to the first and second flip-flops in a topological manner that results in the first and second flip-flops of the shuffle unit to store said second state value and a second input data bit respectively when the corresponding one of said second plurality of data bits is in a first state, and the first and second flip-flops of the shuffle unit to store the second input data bit and said first state value respectively when the corresponding one of said second plurality of data bits is in a second state.

9. The apparatus of claim 8, wherein the shuffle units are serially coupled to each other with a first of the shuffle unit serially coupled to the first XOR gate, and said second input data bit is a selected one of an output bit of an immediately preceding shuffle unit and an output bit generated from the first plurality of data bits.

10. The apparatus of claim 1, wherein the combiner function further comprises an exclusive-OR gate to combine the first plurality of data bits for the network of shuffle units.

11. The apparatus of claim 1, wherein the combiner function further comprises an exclusive-OR gate to combine the third plurality of data bits using an output bit of the network of shuffle units.

12. The apparatus of claim 11, wherein the apparatus further comprises a register coupled to the XOR gate to store a cipher key and allow the stored cipher key to be periodically modified by the output of the exclusive-OR gate.

13. The apparatus of claim 12, wherein the apparatus further comprises a function block coupled to the register to successively transform the modified cipher key, and a mapping block coupled to the register to generate a pseudo random bit sequence based on the successive transformed states of the modified random number.

14. The apparatus of claim 1, wherein the at least one data bit generator comprises a plurality of LFSRs to generate said first, second, and third plurality of data bits.

15. The apparatus of claim 1, wherein the apparatus is a stream cipher.

16. An apparatus comprising:
a first XOR gate to receive a first plurality of data bits and combine them into a second data bit;
a network of shuffle units, coupled to the first XOR gate, to output a third data bit by shuffling and propagating the second data bit through the network of shuffle units under the control of a fourth plurality of data bits; and
a second XOR gate coupled to the network of shuffle units to combine a fifth plurality of data bits using the third data bit;
wherein at least one of the shuffle units comprises a first and a second flip-flop to store a first and a second state value, and a plurality of selectors coupled to the first and second flip-flops to control selective output of one of the first and second state values based on a corresponding one of said fourth plurality of data bits.

17. The apparatus of claim 16, wherein said plurality of selectors are coupled to the first and second flip-flops of the shuffle unit in a topological manner that results in the first state value of the shuffle unit being output when the corresponding one of said fourth plurality of data bits is in a first state, and the second state value of the shuffle unit being output when the corresponding one of said fourth plurality of data bits is in a second state.

18. The apparatus of claim 17, wherein said plurality of the selectors are further coupled to the first and second flip-flops to control selective modification of the first and second state values stored in the first and second flip-flops of the shuffle unit based on the same corresponding one of said fourth plurality of data bits.

19. The apparatus of claim 18, wherein said plurality of selectors are coupled to the first and second flip-flops of the shuffle unit in a topological manner that results in the first state value being output and the first and second flip-flops of the shuffle unit to store said second state value and a sixth data bit respectively when the corresponding one of said fourth plurality of data bits is in a first state, and the second state value being output and the first and second flip-flops of the shuffle unit to store the sixth data bit and said first state value respectively when the corresponding one of said fourth plurality of data bits is in a second state.

20. The apparatus of claim 19, wherein the shuffle units are serially coupled to each other with a first of the shuffle unit serially coupled to the first XOR gate, and said sixth data bit is a selected one of said second data bit and the output of an immediately preceding shuffle unit.

21. The apparatus of claim 16, wherein at least one of the shuffle units comprises a first and a second flip-flop to store a first and a second state value, and a plurality of selectors coupled to the first and second flip-flops to control modification of the first and second state values based on a corresponding one of said fourth plurality of data bits.

22. The apparatus of claim 21, wherein said plurality of selectors are coupled to the first and second flip-flops of the shuffle unit in a topological manner that results in the first and second flip-flops of the shuffle unit to store said second state value and a sixth data bit respectively when the corresponding one of said fourth plurality of data bits is in a first state, and the first and second flip-flops of the shuffle unit to store the sixth data bit and said first state value respectively when the corresponding one of said fourth plurality of data bits is in a second state.

23. The apparatus of claim 22, wherein the shuffle units are serially coupled to each other with a first of the shuffle unit serially coupled to the first XOR gate, and said sixth data bit is a selected one of said second data bit and the output of an immediately preceding shuffle unit.

24. The apparatus of claim 16, wherein the apparatus further comprises a register coupled to the second exclusive-OR gate to store a value to be periodically modified using the result of said combination of the fifth plurality of data bits.

25. The apparatus of claim 24, wherein the apparatus further comprises a function block coupled to the register to successively transform a modified version of the stored value, and a mapping block coupled to register to generate a pseudo random bit sequence based on the successively transformed states of the modified value.

26. The apparatus of claim 25, wherein the apparatus is a stream cipher.

27. A hardware implemented method using a network of shuffle units comprising:

generating a first, second and third plurality of data bits; and shuffling and propagating a fourth data bit generated from the first plurality of data bits, under the control of the second plurality of data bits, to output a fifth data bit to combine the third plurality of data bits.

28. The method of claim 27, wherein the fourth data bit is serially shuffle and propagated, and at each stage, a first state value is output when the corresponding one of said second plurality of data bits is in a first state, and a second state value is output when the corresponding one of said second plurality of data bits is in a second state.

29. The method of claim 27, wherein the fourth data bit is serially shuffle and propagated, and at each stage, a first of the state values is replaced by an input value, and shuffled, when the corresponding one of said second plurality of data bits is in a first state, and a second of the state values is replaced by the input value and shuffled, when the corresponding one of said second plurality of data bits is in a second state.

* * * * *